United States Patent
Davis

(10) Patent No.: US 7,147,234 B2
(45) Date of Patent: Dec. 12, 2006

(54) LOCKING LEVELING SUPPORT LEGS FOR WHEELBARROW

(76) Inventor: Larry E. Davis, 297 Lee Pritchett Rd., Ellijay, GA (US) 30540

(*) Notice: Subject to any disclaimer, the term of this patent is extended or adjusted under 35 U.S.C. 154(b) by 129 days.

(21) Appl. No.: 10/825,248

(22) Filed: Apr. 15, 2004

(65) Prior Publication Data

US 2005/0012285 A1    Jan. 20, 2005

Related U.S. Application Data

(60) Provisional application No. 60/487,799, filed on Jul. 17, 2003.

(51) Int. Cl.
  *B62B 1/18*    (2006.01)
  *B62B 1/00*    (2006.01)

(52) U.S. Cl. .............. 280/47.31; 280/47.33; 280/47.131

(58) Field of Classification Search .......... 280/47.131, 280/47.31, 47.17, 47.32–47.33, 653, 859, 280/6.153–6.154, 6.15, 47.3; 298/2, 3; 248/446
See application file for complete search history.

(56) References Cited

U.S. PATENT DOCUMENTS

| | | | | |
|---|---|---|---|---|
| 411,319 A | * | 9/1889 | Barr | 298/3 |
| 855,309 A | * | 5/1907 | Heineman | 298/3 |
| 1,363,327 A | * | 12/1920 | Larsh | 280/6.154 |
| 2,293,188 A | * | 8/1942 | Brice | 182/200 |
| 5,026,079 A | * | 6/1991 | Donze et al. | 280/47.31 |
| 5,106,113 A | * | 4/1992 | Piacentini | 280/47.21 |
| 5,149,116 A | * | 9/1992 | Donze et al. | 280/47.26 |
| 5,465,801 A | * | 11/1995 | Hoover | 180/19.1 |
| 5,489,000 A | * | 2/1996 | Hillbohm | 180/19.1 |
| 5,687,979 A | * | 11/1997 | Plevka | 280/47.19 |
| D404,534 S | * | 1/1999 | Dickson | D34/16 |
| 5,924,708 A | * | 7/1999 | Bisaillon et al. | 280/47.26 |
| 6,099,025 A | * | 8/2000 | Rohrs | 280/659 |
| 6,446,989 B1 | * | 9/2002 | Intengan | 280/47.34 |
| 6,508,478 B1 | * | 1/2003 | Ortez | 280/47.34 |
| 6,554,301 B1 | * | 4/2003 | Scott et al. | 280/47.31 |
| 6,755,478 B1 | * | 6/2004 | Messinger-Rapport | 298/3 |
| 6,880,852 B1 | * | 4/2005 | Lim | 280/653 |
| 6,886,838 B1 | * | 5/2005 | Zimmerman | 280/47.31 |
| 6,908,088 B1 | * | 6/2005 | Feick | 280/47.131 |
| 6,923,469 B1 | * | 8/2005 | Tomchak et al. | 280/653 |
| 2004/0222604 A1 | * | 11/2004 | Capers et al. | 280/47.31 |
| 2004/0227314 A1 | * | 11/2004 | Black, Jr. | 280/47.31 |
| 2005/0104311 A1 | * | 5/2005 | Benton et al. | 280/47.31 |

\* cited by examiner

*Primary Examiner*—Christopher P. Ellis
*Assistant Examiner*—Vaughn T. Coolman

(57) ABSTRACT

An improved leg means providing leveling support for a wheelbarrow resting on un-level ground. As wheelbarrow is lowered to resting position, a center pivoting cradle leg member having left and right leg-feet portions depending downward and laterally outward from under each side of wheelbarrow undercarriage touchable to ground. The cradle leg member is supported by an axle passing through a vertical elongated slot in a yoke member than passing through the cradle leg member center between left and right feet portions. The slotted yoke member is affixed onto wheelbarrow undercarriage. The axle support provides for up and down and seesaw action of cradle leg member. Further lowering of the wheelbarrow will settle it down against the cradle legs which are now graduated to slope of ground. A fixed locking pin member at center of undercarriage supporting will mesh with a toothed locking gear portion of the cradle leg support. The wheelbarrow is now resting supported by the cradle legs at the level which it was released. When lifting wheelbarrow manually, the cradle leg will drop down unlocked and unsupporting, resting at bottom of the vertical slot in yoke member. Wheelbarrow is now being supported by its wheel and user.

8 Claims, 1 Drawing Sheet

LOCKING LEVELING SUPPORT LEGS FOR WHEELBARROW

CROSS-REFERENCE TO RELATED APPLICATIONS

Figure 1:
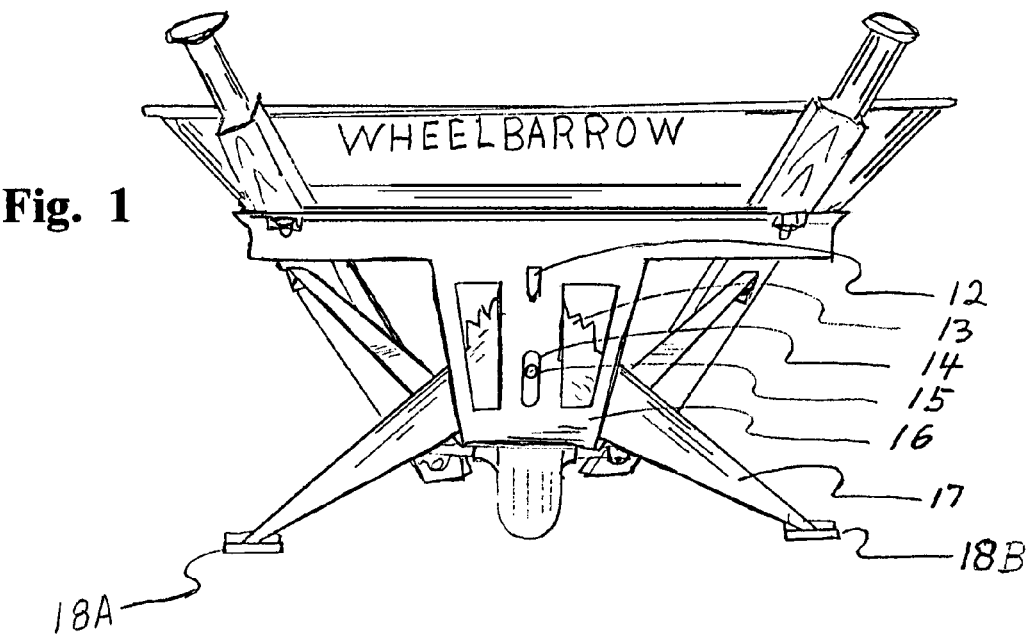

This application claims the benefit of Provisional Patent Application Ser. No. 60/487,799, filed Jul. 17, 2003 by the present inventor.

FEDERALLY SPONSERED RESEARCH

Not Applicable

SEQUENCE LISTING OR PROGRAM

Not Applicable

BACKGROUND OF INVENTION

1. Field Invention

This invention relates to a device and means for leveling and stabilizing a resting wheelbarrow.

A wheelbarrow by nature of design is unstable when resting, unless parked on a level terrain and is easy tipped over. Such instability is dangerous and wasteful sometimes spilling cargo such as cement.

2. Description of Prior Art

U.S. Pat. No. 5,026,079 to Donze et al, discloses a balanced multi-wheel wheelbarrow.

Multi-wheels on wheelbarrows are substantially disadvantaged in the work place since they cannot maneuver through tight places and narrow paths or along narrow walkways. The present invention has the advantages of the singular wheel wheelbarrow while in motion but can set resting level and stable on a lateral unlevel surfaces also, The present invention will provide leveling support whereas multi-wheel support does not.

In respect to the present invention, which substantially departs from prior art, and in doing so provides leveling support stability, while resting, yet transports cargo as a single wheel wheelbarrow.

Therefore, it can be appreciated there is a need for a self leveling stabilizing system for a resting wheelbarrow sitting on a lateral unlevel surfaces. The present invention fulfills this need.

In view of the forgoing disadvantages in the known types of wheelbarrow stabilization arts, the present invention does not decrease the efficiency of a regular triangular supported wheelbarrow but only enhances its efficiency in that during usage it is held level by user, and when not in use it is supported level by the present invention.

SUMMERY OF INVENTION

To attain resting stability, the fixed non-leveling rear legs depending downwardly from a wheelbarrow tray positionable on the ground, are replaced with a self-leveling, locking, leg support means. Such means comprise a cradle leg member, having left and right feet portions. The cradle is centrally and swivel-ably hung with a thru-axle attached cradled perpendicular to undercarriage of wheelbarrow onto a yoke member having a vertical slot accepting thru-axle. Further portions of the cradle leg support member, comprise an upward oriented fan like part-circle teeth portion. Also a stationary locking pin, mesh-able with the teeth portion. As user releases control of wheelbarrow, sequentially the cradle feet will touch ground, swiveling cradle on its axle according to slope of ground. As wheelbarrow continues down, resting, the cradle yoke support member will slide down further, allowing the locking pin to mesh, with the indexing teeth. Such locking, of the stationary pin into the circular movable teeth, will stabilize the wheelbarrow at the level in which user released it.

OBJECTS AND ADVANTAGES

The main object and advantage of this present invention is a means for allowing a wheelbarrow to rest stable and level on laterally sloped or otherwise obstructed ground.

It is common that areas where wheelbarrows are used are unlevel and sometimes cluttered with debris, the present invention will laterally level a wheelbarrow while resting without hindering its maneuverability while in use.

Let it be understood that the present invention can be an add-on improvement to a wheelbarrow thus replacing the fixed rear leg support thereon.

Further object of this invention is that it is not limited to the wheelbarrow but can be used on other implements needing leveling support.

As such, those skilled in the art will appreciate the concept, upon which this disclosure is based, and can readily be utilized as a bases for the design of other structures, methods and systems for carrying out the purposes of the invention. It is important, therefore, that the claims be regarded as including such equivalent constructions insofar as they do not depart from the spirit and scope of the present invention.

It is therefore an object of the present invention to provide a means for leveling and stabilizing a resting wheelbarrow preventing spillage and tip-over.

DRAWINGS—FIGURES

FIG. 1 Viewing the rear undercarriage of a wheelbarrow, resting on a Leveling-Locking-supporting Leg means showing a cradle leg member having left and right feet portions and a toothed locking portion, attached thereto a yoke member with an axle running through a vertical elongated slot. Further shown a fixed locking pin in the yoke member with yoke member attached to undercarriage of wheelbarrow.

Figure 2:
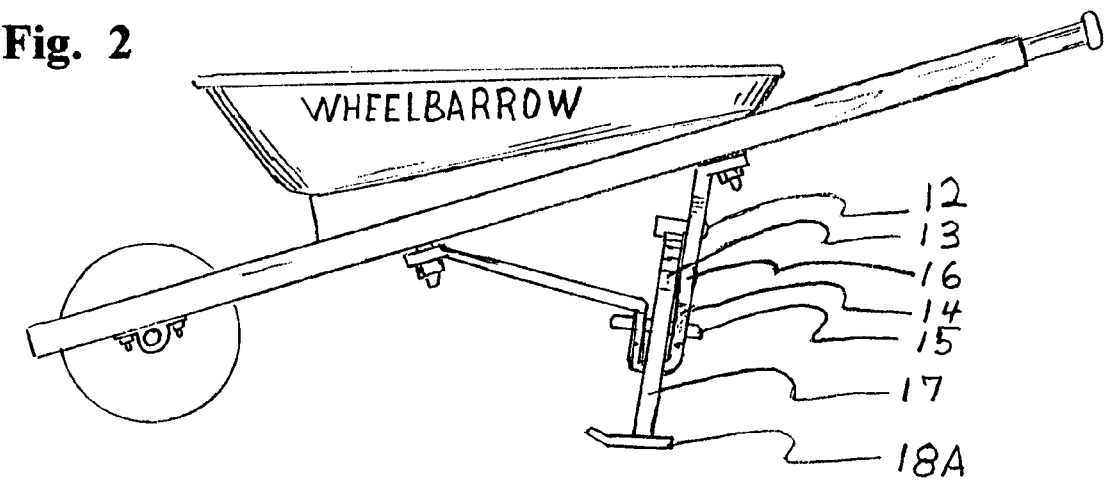

FIG. 2 Viewing the left side of wheelbarrow resting on a Leveling-Locking-Supporting Leg means, showing the left side of a cradle leg member with a left foot portion and a toothed locking portion, attached thereto a yoke member with an axle running through a vertical elongated slot. Further shown is a fixed locking pin in the yoke member and yoke member attached to undercarriage of wheelbarrow.

DRAWINGS—REFERENCE NUMERALS

| | |
|---|---|
| 12 | locking pin |
| 13 | toothed locking portion |
| 14 | vertical elongated slot |
| 15 | Axle |
| 16 | Yoke |
| 17 | cradle Leg member |
| 18A | Left foot |
| 18B | Right foot |

DRAWINGS OF PREFERRED EMBODIMENTS

FIG. 1 Viewing rear undercarriage of wheelbarrow, with a Leveling-Locking-Support-Leg adaption depending down from wheelbarrow undercarriage consisting, a cradle leg member 17 with a locking teeth portion 13 and with a left foot portion 18A and a right foot portion 18B. The leg member 17 hung in a vertical elongated slot 14 in a yoke member 16 with an axle member 15. Yoke member 16 having a fixed locking pin portion 12. Yoke member 16 attachable onto undercarriage of wheelbarrow.

FIG. 2 Viewing left side of wheelbarrow, with a Leveling-Locking-Support-Leg adaption depending down from wheelbarrow undercarriage consisting, a cradle leg member 17 with a locking tooth portion 13 and with a left foot portion 18A The leg member 17 hung in a vertical elongated slot 14 in a yoke member 16 with an axle member 15. Yoke member 16 attachable onto undercarriage of wheelbarrow.

Operation of FIG. 1 and FIG. 2

As wheelbarrow is sequentially lowered resting, feet portions 18A and 18B of cradle leg member 17 will touch ground and swivel it to the slope of ground. Continued lowering of wheelbarrow will cause vertical elongated slot 14 in yoke 16 to slide down axle 15 in cradle leg member 17 whereas locking pin 12 will contact and mesh with locking tooth portion 13 of cradle leg member 17 whereby wheelbarrow will be held support at level manually released.

CONCLUSIONS AND RAMIFICATIONS

The forgoing drawings and wording demonstrate, this wheelbarrow leveling and stabilizing adaption will support a wheelbarrow laterally level while resting on uneven or sloping ground support. Such supporting adaptions as the present invention will not impede normal maneuverability nor efficiency of wheelbarrow. This supporting, leveling, and stabilizing is carried out;

1- by replacing the conventional fixed support legs underneath wheelbarrow with;
2- a leveling support means consisting a lateral cradle leg member with right and left feet-leg portions and,
3- said cradle support member centrally hung underneath wheelbarrow in a vertically slotted stationary yoke member whereas cradle having seesaw and vertical movement capabilities.
4- Further said cradle support member having an upwardly oriented fan-like outer toothed gear portion meshable locking with fixed locking pin at undercarriage support.
5- let it be understood that this locking of the cradle member against the locking pin member could be achieved as well by other frictional means.
6- let it be understood that the indexing locking mechanism could be performed by a manually manipulated means.
7- Let it be further understood that such means and types of fasteners, bends, anchoring materials and such as presented and demonstrated herein is not the invention but,
A- The present invention is a leveling leg support means providing leveling support for an otherwise unstable load mass consisting,
1-A a fixed locking member and,
2-A a terrain seeking un-fixed cradle leg-feet support member with,
3-A a means for locking the fixed locking member and un-fixed cradle leg support member together providing leveling support for unstable implements such as a wheelbarrow.
B- Let it be further understood that this present invention and its embodiments should not be limited to size, number of braces, length of working members, number of anchor points, type and number of hinge point, welds, and materials used, but;
C- This invention relates to an improved leg support means providing leveling support for a resting wheelbarrow resting on un-level ground whereas, when manually lowering a wheelbarrow resting;
  (1) a center pivoting cradled leg member having left and right leg-feet portion depending down and skewed laterally outward from under left to right of wheelbarrow undercarriage is touchable to ground and,
  (2) The cradled legs are seesaw supported with an axle passing through its center between left and right leg-feet portions at right angle to legs and,
  (3) The axle is supported in a vertical elongated slot in a yoke member affixed thereto center undercarriage of wheelbarrow.
  (4) The vertical elongated slot provides for up and down and seesaw action of leg support.
  (5) Lowering wheelbarrow further will settle it down against the cradle legs which have graduated swivelably to slope of ground whereas,
  (6) a locking pin at center of undercarriage support will mesh with a toothed locking portion of cradle leg whereby.
  (7) wheelbarrow is now resting supported by the cradle legs at level released.

SUMMERY OF EMBODIMENTS WORKING

Thus it has been demonstrated that with the above invention a wheelbarrow will set level on otherwise un-level supporting terrain, whereas self-leveling support legs will swivel to slope of ground. The self-leveling support is transmitted from the self-leveling legs therethrough locking members thereon undercarriage of resting wheelbarrow. Such leveling and locking support will enable a wheelbarrow to set resting at level manually released.

What is claimed:

1. A wheelbarrow including a cargo tub portion and undercarriage elongate handles supporting the tub portion; comprising:
    a leveling self-locking leg support mechanism,
    a cupped yoke adapted to support a cradle leg member;
    said cupped yoke comprising vertically oriented spaced apart front and rear flange walls, a connecting floor, and at least one elongate vertical slot disposed along a center face of at least one of said yoke flange walls;
    a permanently stationary pin adapted to lock said cradle leg member, wherein said pin is located above said at least one elongate slot;
    said spaced apart flange walls of said cupped yoke extending upwardly and being secured to a part of said undercarriage elongate handles;
    said cradle leg member including left and right ground supporting feet, a center upwardly extending edge having a plurality of spaced apart teeth along said edge, and an axle adapted to laterally support said cradle-leg member;

said axle located within said at least one elongate vertical slot;

said cupped yoke cooperating with said axle to provide lateral support for said cradle leg member;

said at least one elongate vertical slot allowing up and down movement of said cradle leg axle, thus allowing automatic meshing and un-meshing of said spaced apart teeth with said pin.

2. The wheelbarrow as described in claim 1, wherein said flange walls define and substantially limit the yaw and pitch of said cradle leg member.

3. The wheelbarrow as described in claim 2, wherein said flange walls allow up and down movement as well as rotation of said cradle-leg member about said axle, thereby providing a see-saw leveling of said cradle leg member.

4. The wheelbarrow as described in claim 3, said at least one elongate slot substantially limiting lateral displacement of said cradle leg member.

5. The wheelbarrow as described in claim 4, wherein said axle of said cradle leg member is affixed at a right angle thereto;

said axle being oriented along a longitudinal axis of said wheelbarrow;

said axis being located substantially below said handles.

6. The wheelbarrow as described in claim 5, said axis being translatable along said at least one elongate slot, thereby providing vertical movement of said cradle leg member.

7. The wheelbarrow as described in claim 1, said axle being elevated up from said connecting floor when said wheelbarrow handles are manually released by a user; said elevation of axle causing said teeth of the cradle leg member to mesh with said pin, thereby automatically locking the cradle-leg member with and relative to the cupped yoke.

8. The wheelbarrow as described in claim 1, wherein a downward movement of said cradle-leg member results from the handles of said wheelbarrow being manually supported by a user;

said downward movement disengaging said teeth from said pin and allowing said cradle-leg member to rest on said connecting floor.

* * * * *